United States Patent
Milad et al.

(10) Patent No.: US 9,663,220 B2
(45) Date of Patent: May 30, 2017

(54) SYSTEMS AND METHODS FOR LOCKING A CONTROL LEVER

(71) Applicant: The Boeing Company, Chicago, IL (US)

(72) Inventors: Giumaa Milad, Mount Pleasant, SC (US); Edward M. Hojnacki, Charleston, SC (US); William Otto Zschoche, Summerville, SC (US)

(73) Assignee: The Boeing Company, Chicago, IL (US)

( * ) Notice: Subject to any disclaimer, the term of this patent is extended or adjusted under 35 U.S.C. 154(b) by 256 days.

(21) Appl. No.: 14/193,330

(22) Filed: Feb. 28, 2014

(65) Prior Publication Data

US 2015/0246723 A1    Sep. 3, 2015

(51) Int. Cl.
*B64C 13/14* (2006.01)
*B60R 25/06* (2006.01)

(52) U.S. Cl.
CPC ............ *B64C 13/14* (2013.01); *Y10T 70/40* (2015.04)

(58) Field of Classification Search
CPC ......... B64C 13/04; B64C 13/14; B64D 45/00; B60R 25/002; B60R 25/003; B60R 25/066; B60R 25/007; B60R 25/06; Y10T 70/5611; Y10T 70/569
USPC ................... 244/220, 224, 234, 235
See application file for complete search history.

(56) References Cited

U.S. PATENT DOCUMENTS

| | | | | |
|---|---|---|---|---|
| 1,288,569 A | * | 12/1918 | Hallock | B60R 25/005 70/200 |
| 1,662,099 A | * | 3/1928 | Anderson | 70/254 |
| 3,678,228 A | * | 7/1972 | Adamson | 200/43.15 |
| 3,898,823 A | * | 8/1975 | Ludeman | B64C 13/14 244/224 |
| 4,094,173 A | * | 6/1978 | Brown | B60R 25/06 70/232 |
| 4,167,862 A | * | 9/1979 | Gould | E05B 73/0005 244/1 R |
| 4,228,974 A | * | 10/1980 | Yates | 244/224 |
| 4,732,019 A | * | 3/1988 | Tolar | 70/203 |
| 4,733,029 A | * | 3/1988 | Kobayashi et al. | 200/43.15 |
| 4,825,670 A | * | 5/1989 | Snow | 70/238 |
| 4,913,254 A | * | 4/1990 | Castro et al. | 180/287 |
| 5,042,754 A | * | 8/1991 | Heath | 244/224 |
| 5,081,856 A | * | 1/1992 | Hsu | 70/247 |
| 5,082,213 A | * | 1/1992 | Torres | B64C 13/04 244/224 |
| 5,141,119 A | * | 8/1992 | Milazzo | 212/290 |
| 5,295,375 A | * | 3/1994 | Jonas | 70/247 |
| 5,329,792 A | * | 7/1994 | Lee | B60R 25/066 70/201 |

(Continued)

FOREIGN PATENT DOCUMENTS

| | | |
|---|---|---|
| EP | 1353027 A3 | 5/2006 |
| WO | WO2004033885 A1 | 4/2004 |
| WO | WO2004099602 A2 | 11/2004 |

*Primary Examiner* — Michael Wang (74) *Attorney, Agent, or Firm* — Joseph M. Butscher; The Small Patent Law Group, LLC (57) ABSTRACT

Systems and methods for locking a control lever are provided. One system includes a locking device having a body configured to couple to a control lever within an aircraft to prevent the control lever from moving. The locking device also includes at least one hole defined through the body. The one hole is configured to receive one of a lock or a tag therein.

15 Claims, 5 Drawing Sheets

(56) References Cited

U.S. PATENT DOCUMENTS

| | | | |
|---|---|---|---|
| 5,778,710 A * | 7/1998 | Hu | B60R 25/066 70/192 |
| 5,901,586 A * | 5/1999 | Hale | B64F 1/16 70/18 |
| 5,953,941 A * | 9/1999 | Freund | 70/199 |
| 5,984,241 A | 11/1999 | Sparks | |
| 6,178,788 B1 * | 1/2001 | Winner | 70/38 C |
| 6,286,784 B1 | 9/2001 | Hardy | |
| 6,834,520 B2 | 12/2004 | LaConte et al. | |
| 6,935,097 B2 | 8/2005 | Eschborn | |
| 8,018,696 B2 | 9/2011 | Ahrendt | |
| 8,047,583 B2 | 11/2011 | Clausen | |
| 8,886,370 B2 * | 11/2014 | Carlavan et al. | 701/11 |
| 2005/0001095 A1 * | 1/2005 | Christensen | 244/110 B |
| 2006/0218983 A1 * | 10/2006 | Horne | B60R 25/005 70/203 |
| 2008/0092609 A1 * | 4/2008 | Markbreit | 70/254 |
| 2010/0019097 A1 * | 1/2010 | Probasco et al. | 244/224 |

* cited by examiner

SYSTEMS AND METHODS FOR LOCKING A CONTROL LEVER

BACKGROUND

The present disclosure relates generally to systems and methods for locking controls, such as a flap lever or other control lever within an aircraft flight deck.

During some manufacturing, maintenance, or operation processes, certain hazardous energy producing devices should be disabled or locked during the process. For example, during the manufacturing, maintenance, or operation an aircraft, the thrust reversers may be opened. Depending on the configuration of the aircraft, the flaps and/or slats may collide with the open thrust reversers if the flaps/slats are extended. As such, operators may open the circuit breaker associated with the flaps/slats so that the flaps/slats cannot be extended when the thrust reversers are open. However, another operator may close the circuit breaker without knowing that the circuit breaker should be open. Once the circuit breaker is closed, the flaps/slats might be extended, which can collide with the open thrust reversers. As a result, damage to the aircraft or injury to persons working in the area may occur if the flaps/slats are extended when the thrust reversers are open.

One approach to prevent collision of the flaps/slats with the thrust reveres is to lock the thrust reversers by coding the circuit breaker with a password. However, the operator may forget the password or may not be available to provide the password when required to perform other work, thereby resulting in delay and frustration. Further, such coding may be complex and cumbersome.

Additionally, some known electronic lock outs can be reset electronically without a passcode or key. As a result, the lock out may be inadvertently disabled without the knowledge of individuals in the area. As such, the flaps/slats may be unintentionally activated when, for example, the thrust reversers are open.

SUMMARY

In accordance with an embodiment, a locking device is provided. The locking device includes a body configured to couple to a control lever within an aircraft to prevent the control lever from moving. The locking device also includes at least one hole defined through the body. The one hole is configured to receive one of a lock or a tag therein.

In accordance with another embodiment, an aircraft is provided that includes a fuselage, a flight deck located at a front of the fuselage, and a control pedestal having one or more control levers, wherein the control pedestal is within the flight deck. A locking device is further provided and coupled to at least one of the one or more control levers. The locking device includes a body dimensioned to prevent the control lever from moving when coupled thereto. The locking device also includes at least one hole defined through the body. The hole is configured to receive one of a lock or a tag therein.

BRIEF DESCRIPTION OF THE DRAWINGS

Having thus described examples of the disclosure in general terms, reference will now be made to the accompanying drawings, which are not necessarily drawn to scale, and wherein like reference characters designate the same or similar parts throughout the several views, and wherein:

DETAILED DESCRIPTION

The following detailed description of certain embodiments will be better understood when read in conjunction with the appended drawings. It should be understood that the various embodiments are not limited to the arrangements and instrumentality shown in the drawings.

As used herein, an element or step recited in the singular and proceeded with the word "an" or "an" should be understood as not excluding plural of said elements or steps, unless such exclusion is explicitly stated. Furthermore, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting. Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Various embodiments provide a lockout device or lockout tool, which may be used, for example, in areas or applications having hazardous energy producing devices. In one particular embodiment, a Lock Out Tag Out (LOTO) tool for the flap detent lever (also referred to as the flap lever) of an aircraft is provided that physically locks out the lever to prevent inadvertent deployment (such as during deployment of flaps/slats, e.g., leading edge slats). For example, in one embodiment, the lockout device has an integrated locking feature that fits into a bracket of a control pedestal, such as a fuel cutoff bracket, to keep the device from being inadvertently removed. The device may incorporate a built in twist lock, a nose lock feature, and/or a tag attachment eyelet as described in more detail herein.

It should be noted that although the lockout device is described in connection with a particular environment, which includes a lever control in a flight deck of an aircraft, the lockout device may be used in connection with other controls, in the same or different aircraft, as well as in non-aircraft applications. For example, while various embodiments may be described in connection with a particular aircraft, the various embodiments may be used in different applications, such as in connection with locking controls for land, air, sea and pressurized space applications, as well as non-transport or non-mobile platform applications. It also should be noted that in some embodiments, the lockout device provides universal operation across a number of different aircraft type.

In general, various embodiments provide a lockout device that physically couples to, for example, a flap lever to prevent the flaps (or slats) of an aircraft from being extended. In one embodiment, the device includes at least one hole that receives a keyed lock to prevent the tool from being removed from the flap lever. Optionally, a tag or other identifier can be attached to the device to indicate information regarding the tool, such as the person who installed the tool, when the tool was installed, and/or the reason why the tool was installed, among others. In some embodiments, the device may include a plurality of holes (e.g., two holes) for separate keyed locks so that different individuals or teams working on the aircraft can independently device the tool.

The device includes mechanisms to prevent inadvertent removal. For example, in some embodiments, as described herein, a pin is located near a bottom end of the device and a yoke at a top end. The pin couples to a bracket or tab near the lowest point of travel of the flap lever. The yoke fits about the flap lever when the flap lever is at a highest point of travel. As such, the pin and the yoke secure the device to the flap lever so that the device cannot be inadvertently removed from the flap lever. Thus, in operation, when the device is in place and engaged with the flap lever, the flaps cannot be extended and, thus, prevents the possibility of collisions between the flaps and open thrust reversers. Accordingly, the device, in various embodiments, provides a lever brace that prevents manipulation of aircraft flaps and slats if that manipulation could interfere with other work being done on the aircraft, such as work that includes opening the thrust reversers. Moreover, the device, in various embodiments, by locking the flaps/slats can prevent or reduce the likelihood to, for example, tools or personnel that are working near or on the top of the wing.

Figure 1:
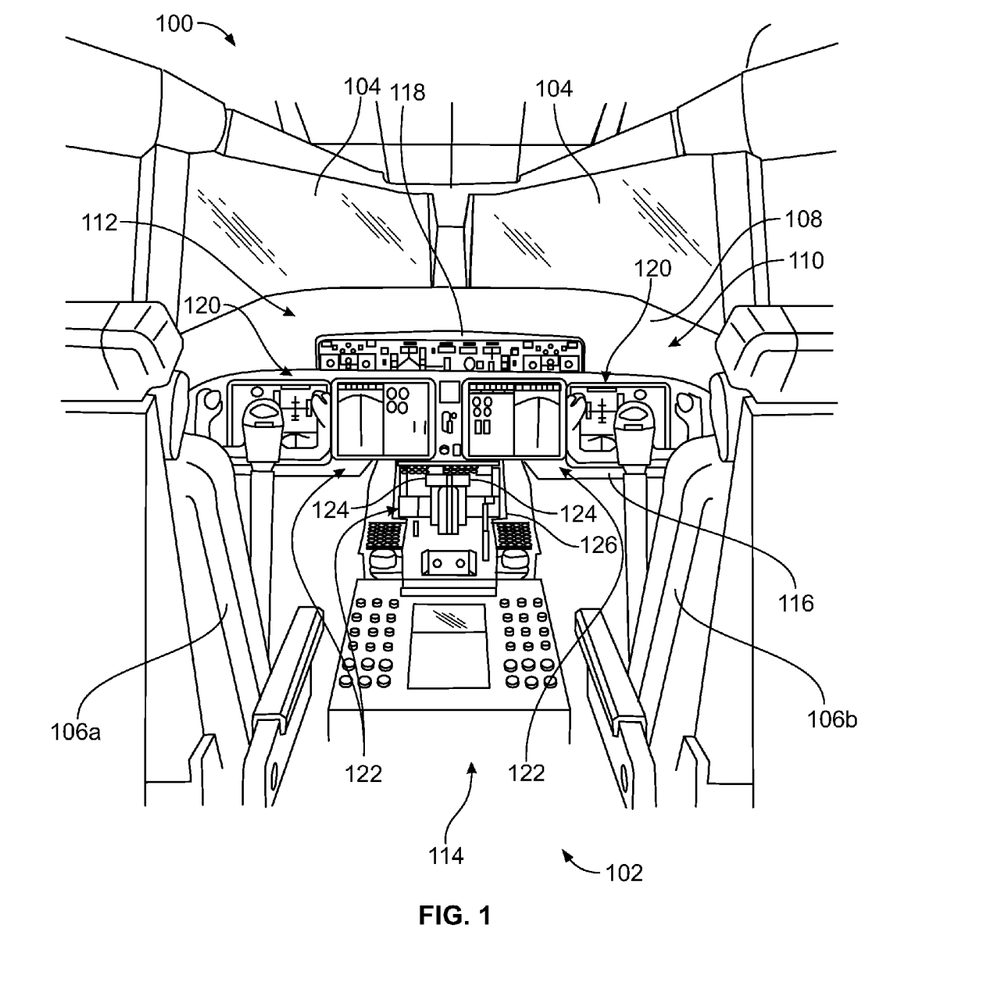
FIG. 1 is an illustration of a flight deck in which various embodiments may be implemented.

FIG. 1 illustrates a portion of an aircraft 100, in particular a portion of a flight deck 102, in which various embodiments may be implemented. One or more controls or interfaces can be housed at the flight deck 102 for access by an operator (e.g., a pilot). For example, the flight deck 102 can generally include input/output devices via which the operator can provide information to a computer (e.g., a flight guidance computer), such as to perform navigation functions, communication functions, electronic checklist functions, among others.

The flight deck 102 also includes forward windows 104 providing a forward field of view from the aircraft 100 for operators seated in a first seat 106a and/or a second seat 106b. In other embodiments, the forward windows 104 can be replaced with one or more external vision screens that include a visual display of the forward field of view out of the aircraft 100. A glare shield 108 can be positioned adjacent to the forward windows 104 to reduce the glare on one or more flight instruments 110 and displays 112 positioned on a control pedestal 114 and a forward instrument panel 116. The glare shield 108 can also house other control panels 118 (e.g., a mode control panel), which may be positioned above the displays 112. The displays 112 can include, for example, primary flight displays (PFDs) 120 that provide the operators with flight parameter information (e.g., flight attitude, airspeed and altitude), and multifunction displays (MFDs) 122 that display other operator-selectable information.

The flight deck 102 also includes as part of the control pedestal 114 one or more throttle controllers 124 and a thrust reverser lever 125 that allows for activation of the thrust reversers. Additionally, one or more control levers, such as a flap lever 126, is provided that allows for operation of the flaps. However, in some embodiments, the flap lever 126 allows operation or actuation of one or more slats. It should be appreciated that the configuration of the flight deck 102 and the flap lever 126 is merely for example and various embodiments may be used to lock out flap levers 126 in different flight decks or different controls in the illustrated flight deck 102.

Figure 2:
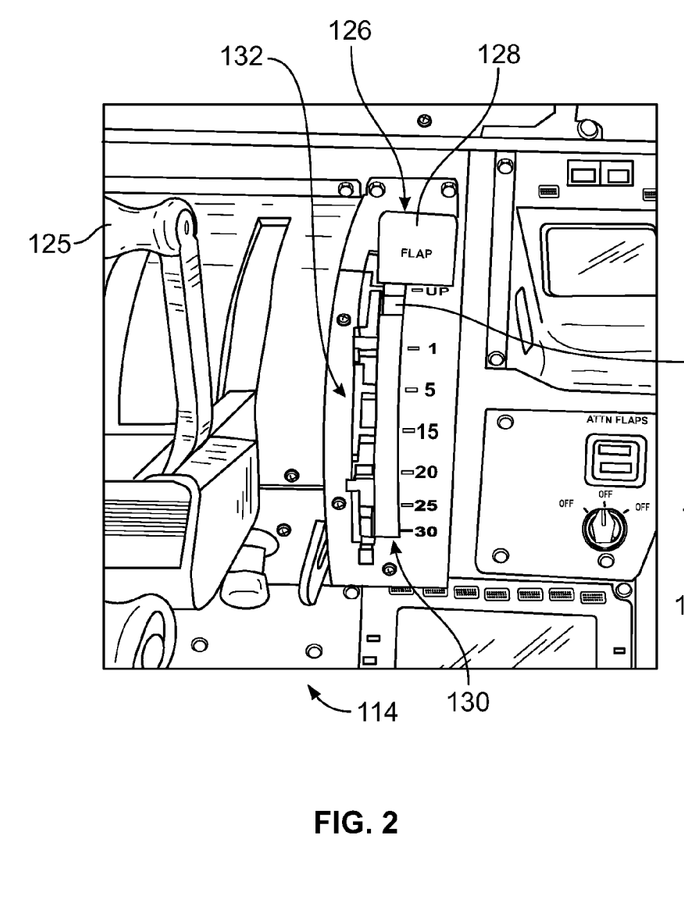
FIG. 2 is an illustration of a portion of a flight deck having a flap lever that various embodiments may lock.

FIG. 2 is a more detailed illustration of a portion of the control pedestal 114 showing the flap lever 126. As can be seen, the flap lever 126 is moveable within a slot 130 to allow movement and actuation of the flaps. In particular, in the illustrated embodiment, the flap lever 126 includes a handle 128 that is operable by a user (e.g., pilot) to move the flap lever 126 along the slot 130 to extend or retract the flaps of the aircraft 100. The handle 128 may be connected to an arm 134 that engages within the slot 130 to allow movement therein, which in this embodiment is translational movement upwards and downwards as viewed in FIG. 2.

Additionally, a plurality of detents 132 are provided along one edge of the slot 130, which in this embodiment is along the left edge of the slot on the control pedestal 114. However, the detents 132 may be provided along different edges or along more or less of the edge shown. The detents 132 allow for maintaining the flap lever 126 in one of a plurality of positions along the slot 130, such that once engaged with a particular detent 132, further movement of the flap lever 126 is resisted until the flap lever 126 is moved out of the detent. Thus, the detents 132 allow for incremental positioning of the flap lever 126 along the slot 130. The detents 132 generally include detent portions in which movement of the flap lever 126 is resisted when a portion of the flap lever 126 is inserted therein (e.g., into laterally extending slots). Thus, the detents 132 generally define a plurality of points of resistance at which the flap lever 126 may be positioned.

Figure 3:
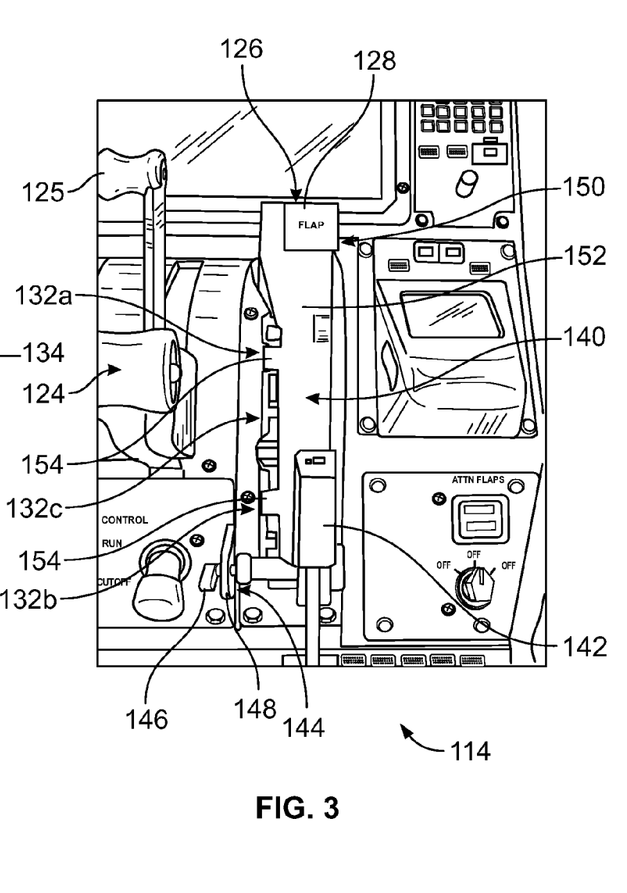
FIG. 3 is an illustration of a lockout device in accordance with an embodiment coupled to the flap lever of FIG. 2.

As can be seen in FIG. 3, a lockout device 140 (which may also be referred to as a lockout tool or lockout tagout device) may be engaged with and lock the flap lever 126 to prevent movement of the flap lever 126. The lockout device 140 is configured to engage within or with one or more portions of, for example, the control pedestal 114 and/or detents 132 to prevent movement of the flap lever 126. As should be appreciated, with the lockout device 140 coupled to the flap lever 126, the flaps of the aircraft 100 are prevented from being extended as the flap lever 126 is locked into place.

The lockout device 140 includes one or more locking portions to maintain the lockout device 140 engaged with the flap lever 126. For example, at a lower end of the lockout device 140 as viewed in FIG. 3, the lockout device 140 may include a hole (not shown in FIG. 3) in which a lock 142 (illustrated as a keyed lock) is received (e.g., inserted therethrough) to prevent the lockout device 140 from being removed from the flap lever 126 as described in more detail herein. It should be noted that additional portions (e.g., additional holes) may be provide for receiving additional locks. It also should be noted that the lock 142 may be any type of lock 142 or securing member that prevents removal thereof from the lockout device 140. Thus, for example, the lock 142 may be any member or device that locks a portion of the lockout device 140 with respect to the flap lever 126. In various embodiments, the lock 142 may provide another visual indication of the locking arrangement. For example, the lock 142 may be colored (e.g., a portion colored red) to indicate or notify to a person of the locking arrangement, thereby indicating to the person that the flap lever 126 is in a locked and non-useable state or condition.

The lockout device 140 also includes a pin 144 illustrated at a bottom end as viewed in FIG. 3 to allow coupling to a bracket 148 of the control pedestal 114. For example, when the lockout device 140 is engaged with the flap lever 126, the pin 144 is aligned with an opening within the bracket 148, allowing a locking end 146 to be inserted therethrough. The locking end 146 generally defines a protruding member having a portion that is not aligned with the opening of the bracket 148, which in this embodiment is illustrated as generally perpendicular to the opening. Thus, the bottom portion of the lockout device 140 in this embodiment is secured to part of the control pedestal 114. It should be noted that the pin 144 in various embodiments is removably coupled to the lockout device 140 at the lower end thereof. For example, the lockout device 140 may be positioned in location with the pin 144 then inserted through the bracket 148 of the control pedestal 114 to secure the lockout device 140 to the control pedestal 114. As described in more detail herein, the pin 144 may be secured within an opening of the lockout device 140 and locked thereto once the lock 142 is received within and coupled to the lockout device 140.

In various embodiments, the pin 144 is configured to initially spin with respect to the lockout device 140 to align within the lockout device 140 to allow coupling of the lock 142 thereto. For example, the pin 144 may have an opening therein that is configured to be accessible once received within the lockout device 140 to allow insertion therethrough of the lock 142. For example, a curved top portion of the lock 142 may extend and lock through the opening of the pin 144. Once coupled to the lockout device 140, the pin 144 is locked in place and the lock 142 prevents the pin 144 from being removed from the lockout device 140, such as by moving the pin 144 in an opposite direction to a direction for securing the pin 144 to the lockout device 140. Thus, with the pin 144 coupled to the lockout device 140 and through the bracket 148, the pin is incapable of movement in a direction that allows removal thereof, which in this embodiment is laterally to the left as viewed in FIG. 3. Accordingly, the hole or other securing portion of the pin 144 is not aligned with the axis of access or removal. For example, in one embodiment, a perpendicular arrangement is provided such that the pin 144 cannot move once secured to the lockout device 140.

Additionally, the lockout device 140 includes an engagement portion 150 at a top end of the lockout device 140 as viewed in FIG. 3. The engagement portion 150 in one embodiment, as described in more detail herein, is configured as a yoke that fits about the flap lever 126 such that the flap handle 128 is secured within the opening of the yoke. In this embodiment, the engagement portion 150 engages and fits about (e.g., abutting engagement with) the flap lever 126, when the flap lever 126, including the flap handle 128 is at a highest point of travel (a top most point as viewed in FIG. 3). However, is should be appreciated that the lockout device 140, in particular, the length of the body 152 may be sized to lock the flap lever 126 at a location other than at the highest point.

It should be noted that different alignment of other engagement portions may be provided as part of the lockout device 140. For example, in the illustrated embodiment, the lockout device 140 includes a plurality of tabs 154 that engage within and align the lockout device 140 with the flap lever 126. In the illustrated embodiment, the tabs 154 extend laterally from a side of the body 152 of the lockout device 140 and engage within one or more of the detents 132*a* and 132*b*. However, it should be appreciated that additional or fewer tabs 154 may be provided and may engage with one or more different detents, such as the detent 132*c*.

In various embodiments, the lockout device 140 may be configured as a LOTO device allowing for tagging or identifying of the lockout device 140 including details regarding the installation of the lockout device 140, among other information. For example, as described in more detail herein, one or more tags may be coupled to the lockout device 140 to identify different types of information regarding the installation of the lockout device 140 (e.g., person installing and date of installation), the required or desired duration of lockout, and/or the reason for lockout, among others. In some embodiments, the lockout device 140, such as the engagement portion 150, includes one or more openings therethrough that allows insertion of the tag, such as a string portion of the tag for coupling to the lockout device 140. However, the tag may be coupled and positioned to other portions of the lockout device 140 or other openings may be provided to receive the tag as described herein. Additionally, the tag may be coupled to a same portion of for example, the control pedestal 114 and to which the lockout device 140 is coupled. For example, the tag may be coupled to an opening (e.g., eyelet) of the bracket 148 through which the pin 144 also extends or through an opening of the locking device 140 as described herein. The tag may also provide a general notification or a standard identifying or caution message. For example, the tag may include the following: "Warning, Do Not Operate or Apply Power."

Thus, in operation, the pin 144 and the engagement portion 150, such as a yoke, engage with the flap lever 126 to prevent movement of the flap lever 126. As a result, movement of the flaps (or slats) of the aircraft 100 is prevented. For example, in the locked position shown in FIG. 3, the slats cannot be extended, which prevents possible collision between the flaps and open thrust reversers. In this position, the lock 142 secures the flap lever 126 in fixed location and orientation with respect to the flap lever 126 to prevent movement thereof. As described in more detail herein, other locking members, including additional locks 142 may be secured to the lockout device 140, such as to the engagement portion 150, thereby providing a redundant locking arrangement.

As should be appreciated, the lockout device 140 is sized and shaped based on the configuration of the flap lever 126 and the interface with the control pedestal 114. For example, in the illustrated embodiment, the lockout device 140 is curved complementary to the curvature of the portion of the control pedestal 114 along which the flap lever 126 is located. Additionally, the portion(s) of the flap device 140 configured to couple to one or more portions of the flap lockout lever 126 or the control pedestal 114 are sized and shaped, such as positioned, such that when the lockout device 140 is positioned with respect to the flap lever 126, one or more locking elements or members, such as the lock 142, may be positioned with and secured to the lockout device 140 to prevent movement of the flap lever 126.

FIGS. 4 through 7 illustrate the lockout device 140 in accordance with an embodiment. As can be seen in the figures, the body 152 of the lockout device 140 device has a thickness and is curved longitudinally from one end to an opposite end thereof, in this embodiment, between the engagement portion 150 and the pin end of the lockout device 140. It should be appreciated that while the top and bottom end of the lockout device 140 include locking portions for securing the lockout device 140 with respect to the flap lever 126, one or more locking portions alternatively or optionally may be provided at or along different portions of the lockout device 140. Additionally, the locking device 140 including the body 152 may be formed from one or more materials, such as based on the application or desired or required properties. In some embodiments, the body 152 is formed from a plastic or composite material.

As can further be seen, the tabs 154 of the lockout device 140 may be shaped and sized as blocks protruding from the side of the body 152 to extend within and align with one or more of the detents 132 (shown in FIG. 3). It should be appreciated that the tabs 154 may be differently sized and shaped to align or secure with the detents 132 or other portions of the flap lever 126 or control pedestal 114. As can be seen more particularly with respect to FIG. 6, in the illustrated embodiment, the tabs 154 have a triangular shape such that a peak of the tabs 154 is received within and aligns with one or more of the detents 132.

In the illustrated embodiment, the engagement portion 150 that is configured to engage with the flap lever 126 is shaped as a yoke for securing around and receiving therein a portion of the flap lever 126. For example, the engagement portion 150 in the illustrated embodiment includes arms 160 that extend from and are spaced apart to form a channel 162 therebetween. The arms 160 extend along the longitudinal axis to form the channel 162 that is sized and shaped to receive a portion of the flap lever 126 therein, such as the arm 134 (shown in FIG. 2) of the flap lever 126. For example, the channel 162 is sized to receive therein the arm 134 and with the lockout device 140 secured in position, the arms 160 extend around the arm 134 to prevent movement thereof. For example, in one embodiment, the flap lever 126 is in a highest position of operation such that when the lockout device 140 is secured in position, the bottom portion of the channel 162 prevents downward movement of the flap lever 126 along the slot 130 (shown in FIG. 2). Thus, the flap lever 126 cannot move once the lockout device 140 is secure in position. Additionally, with the arm 134 of the flap lever 126 received within the channel 162, the flap handle 128 is positioned above the arms 160 of the engagement portion 150. As should be appreciated, in this position, the shape of the flap handle 128 prevents upward removal of the lockout device 140 therefrom. For example, the flap handle 128 extends laterally and transverse to the arms 160 such that the arms 160 are positioned below the flap handle 128 so that the lockout device 140 cannot be removed, in particular, moved upward from and removed as a result of the flap handle 128 blocking removal therefrom.

It should be noted that additional elements may be provided. For example, the anus 160 may include openings 164 therethrough (one is visible in FIG. 4) to allow securing thereto of a locking member such as the lock 142. For example, the openings 164 may be aligned to receive therethrough the curved top portion of the lock 142 such that the lock 142 blocks the open end of the channel 162 and prevents removal of the arm 134 of the flap lever 126 therefrom. For example, a portion of the lock 142 extends across the channel 162 such that a portion of the lock 142 is transverse to the channel 162. Thus, the lockout device 140 cannot be moved, such as to remove the arm 134 of the lockout device 140 from the channel 162 in multiple directions or axes thereof.

Figures 4, 8:
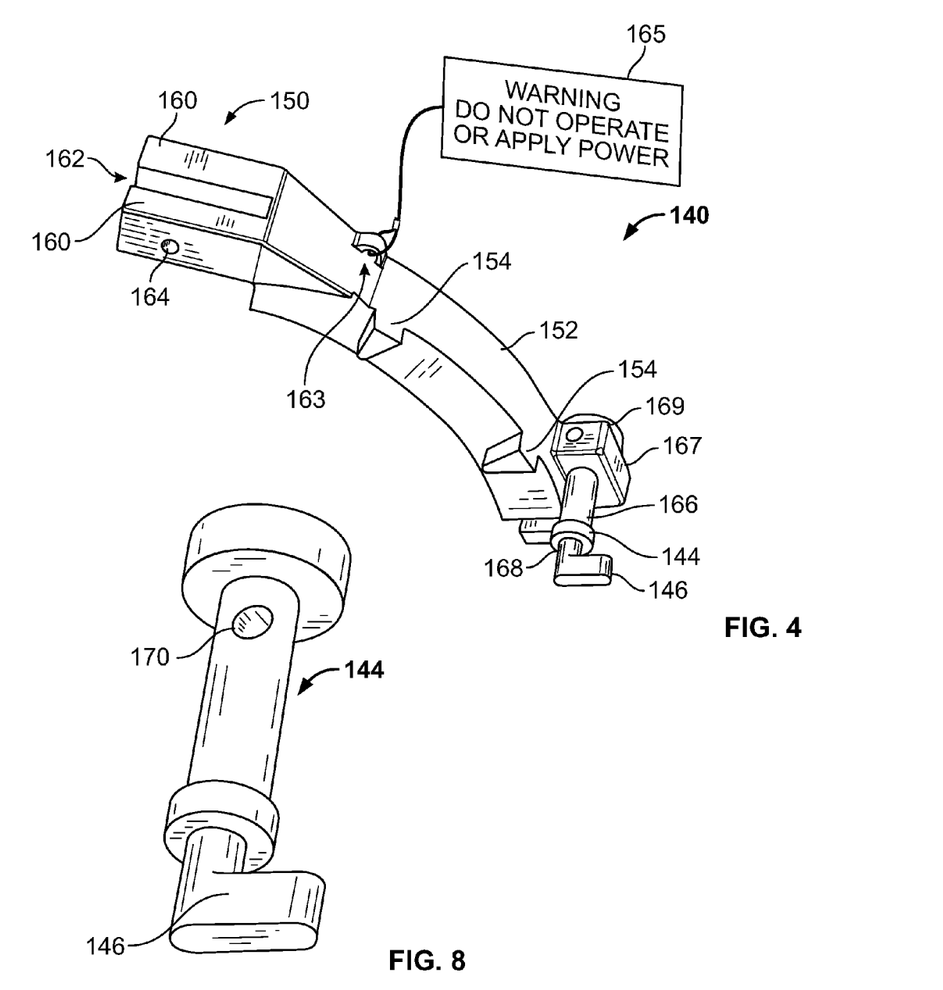
FIGS. 4-7 are illustrations of a lockout device in accordance with an embodiment.
FIG. 8 is an illustration of a pin for a lockout device in accordance with an embodiment.
Figure 5:
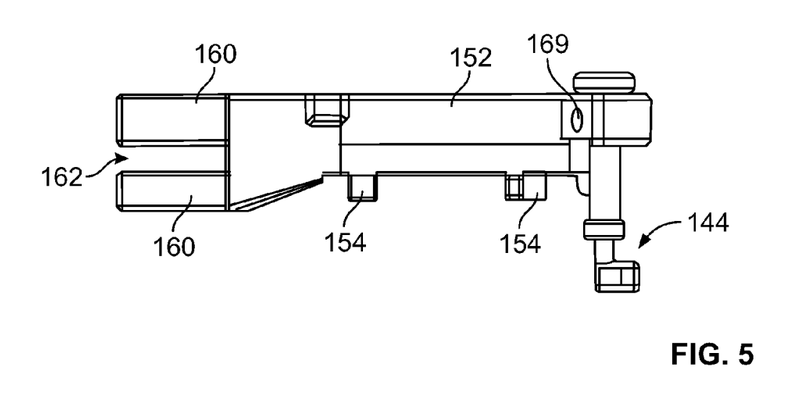
Figure 6:
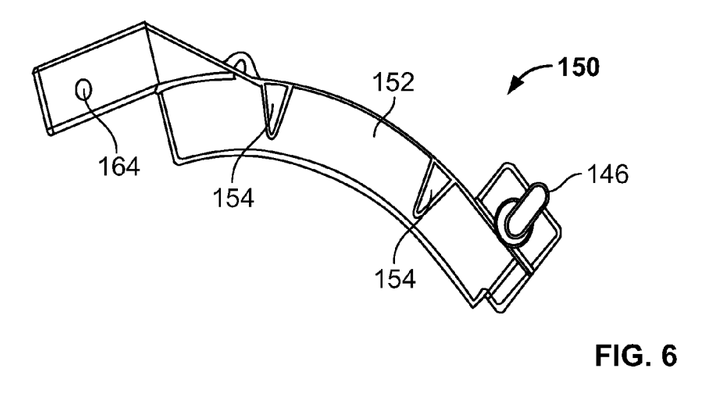
Figure 7:
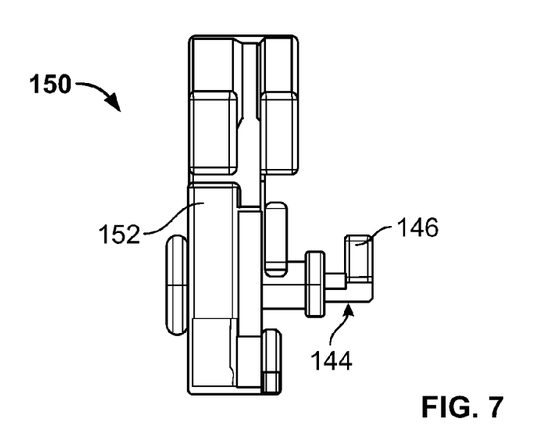

Additionally, an opening 163 optionally may be provided, such as defined through a protrusion extending from a portion of the body 152 as shown in FIG. 4. In this embodiment, the opening 163 extends transverse to the longitudinal axis of the body 152, but other orientations may be provided. The opening 163 is configured to receive therein a portion of a tag 165, for example, a securing portion of the tag 165 (e.g., a string end of the tag 165). In various embodiments, the opening 163 is positioned along the body 152 such that when the tag 165 is coupled thereto, the tag 165 is visible or accessible when the locking device 140 is in the locked position.

With respect now to the end of the lockout device 140 opposite the engagement portion 150, the pin 144 is shown inserted and received within the lockout device 140. In particular, the lockout device 140 includes a receiving portion 166 (illustrated as a cylindrical tube, although other shapes and sizes may be provided) that includes a bore 168 therein for receiving the pin 144. For example, the bore 168 is sized and shaped (e.g., having a diameter and length) to allow insertion and positioning of the pin 144 therein to allow locking of the pin 144 with the lockout device 140.

More particularly, the lockout device 140 includes a hole, also referred to as an opening 169 defining a bore through the lockout device 140, illustrated as extending from the top to bottom of the lockout device 140 as shown in FIG. 4. The opening 169 may extend through a locking portion 167 of the lockout device 140. The opening 169 is transversely aligned with the bore 168 such that when the lock 142 is received therein, the pin 144 cannot be removed from the lockout device 140.

With reference to FIG. 8 and specifically the pin 144, the body of the pin 144 is sized and shaped complementary to the bore 168 to fit and be received therein. The pin 144 also includes an opening 170 at an end thereof opposite the locking end 146. In this embodiment, the opening 170 is positioned along the pin 144 such that when inserted into the bore 168, the pin 144 may be rotated until the opening 170 aligns with the opening 169 of the lockout device 140 such that a bore is formed through the combination of the lockout device 140 and the pin 144. With the openings 169 and 170 aligned, the lock 142 may be inserted therethrough (e.g., curved arm portion of the lock), and as such, the pin 144 cannot be removed through the bore 168. Thus, the pin 144 in various embodiments is dimensioned such that when inserted within the bore 168, the openings 169 and 170 align and the locking end 146 is secured in place, such as to the bracket 148 of the control pedestal 114 (shown in FIG. 3). It should be noted that the pin 144 may include a pair of engagement members, illustrated as cylindrical or ring-shaped members, provided at an end opposite the locking end 146 and proximate the locking end 146 in the illustrated embodiment. The engagement members maintain and prevent the pin from exiting (e.g., falling out of) the locking portion 167. It should be noted that the locking portions may be provided at different locations along the pin 144 and have different shapes and sizes. Also, additional or fewer engagement members may be provided. In various embodiment, the pin 144 is a one-piece design that is locked or "trapped" within the locking portion 167 and prevented from axial movement out of the locking portion 167. In some embodiments, the pin 144, locking end 146, receiving portion 166, and opening 170 may be provide or encapsulated within the locking portion 167 (e.g., not visible to a user).

Thus, in operation, with the lockout device 140 aligned on the control pedestal 114 and with the flap lever 126, the pin 144 is inserted through the bracket 148 of the control pedestal 114 and into the bore 168 of the lockout device 140. Once inserted into the bore 168, the pin 144 is rotated to align the openings 169 and 170 and the lock 142 secured therethrough. In this locked position, the pin 144 cannot be removed from the lockout device 140 and the locking end 146 of the pin 144 prevents the pin 144 from being removed from the control pedestal 114, in particular, back through the bracket 148.

Thus, in the locked position, the lockout device 140 cannot be removed from the locked location on the flap lever 126 and thereby prevents movement of the flap lever 126 as described herein. It should be noted that the lockout device 140 prevents movement thereof in multiple directions or axes such that the lockout device 140 is secured fixedly with respect to the flap lever 126.

Figure 9:
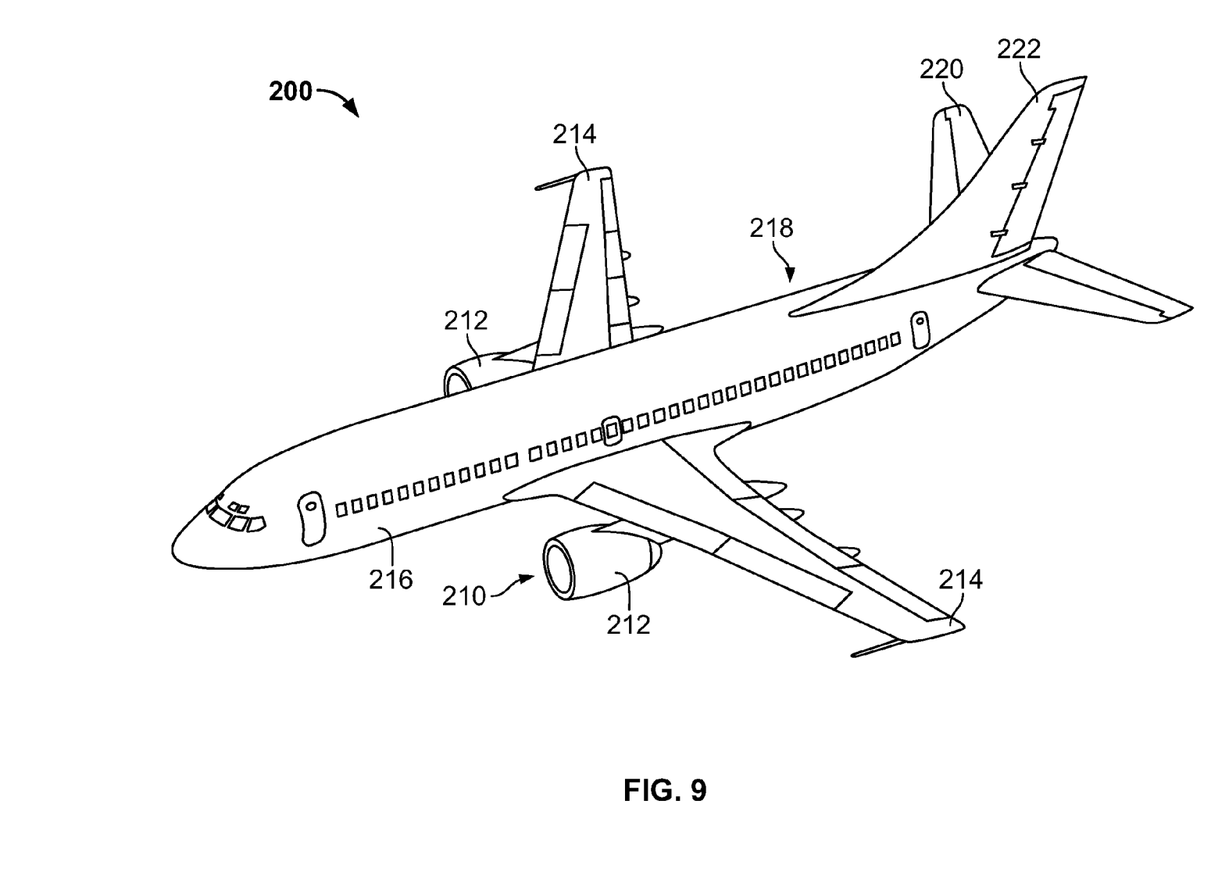
FIG. 9 is an illustration of an aircraft in which various embodiments may be implemented.

Various embodiments may be used, for example, in locking controls in the different types of air vehicles, such as commercial aircraft. For example, FIG. 9 illustrates an aircraft 200 that may include controls locked with one or more embodiments. The aircraft 200 may be embodied, for example, as the aircraft 100. The aircraft 200 includes a propulsion system 210 that includes two turbofan engines 212. The engines 212 are carried by the wings 214 of the aircraft 200. In other embodiments, the engines 212 may be carried by a fuselage 216 (e.g., body of the aircraft 200) and/or the empennage 218. The empennage 218 can also support horizontal stabilizers 220 and a vertical stabilizer 222.

It should be noted that the particular arrangement of components (e.g., the number, types, placement, or the like) of the illustrated embodiments may be modified in various alternate embodiments. In various embodiments, different numbers of a given component or unit may be employed, a different type or types of a component or unit may be employed, a number of components or units (or aspects thereof) may be combined, a given component or unit may be divided into plural components or unit (or sub-units), a given component or unit may be added, or a given component or unit may be omitted.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments without departing from the scope thereof. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the various embodiments should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112, paragraph (f), unless and until such claim limitations expressly use the phrase "means for" followed by a statement of function void of further structure.

This written description uses examples to disclose the various embodiments, and also to enable a person having ordinary skill in the art to practice the various embodiments, including making and using any devices or systems and performing any incorporated methods. The patentable scope of the various embodiments is defined by the claims, and may include other examples that occur to those skilled in the art. Such other examples are intended to be within the scope of the claims if the examples have structural elements that do not differ from the literal language of the claims, or the examples include equivalent structural elements with insubstantial differences from the literal languages of the claims.

What is claimed is:

1. A locking device comprising:
   a body configured to couple to a control lever within an aircraft to prevent the control lever from moving;
   a first hole defined through the body, the first hole configured to receive a lock;
   a second hole defined through the body, the second hole configured to receive a tag; and
   a pin configured to be inserted within a bore defined proximate a bottom end of the body, and when inserted within the bore, extending from an end thereof, the pin coupling to a control pedestal that includes the control lever, wherein the pin comprises an opening therethrough, the opening of the pin configured to axially align with the first hole defined through the body to receive therethrough the lock, and when inserted therethrough, the lock preventing removal of the pin from the body.

2. The locking device of claim 1, wherein the body is configured to physically couple to the control pedestal within a flight deck of the aircraft, wherein the lock or the tag is configured to indicate that the locking device should not be removed from the control lever.

3. The locking device of claim 1, wherein the control lever controls one or more flaps of the aircraft, and further comprising a keyed lock configured to be inserted through the first hole to secure the body to the control lever.

4. The locking device of claim 1, further comprising a plurality of first holes and a plurality of second holes defined through the body, wherein the first hole is one of the plurality of first holes and the second hole is one of the plurality of second holes.

5. The locking device of claim 4, wherein the plurality of first holes are configured to receive the lock and the plurality of second holes are configured to receive the tag.

6. The locking device of claim 1, wherein the body comprises a yoke configured to couple around at least a portion of the control lever, wherein one or both of the first hole or the second hole extends through the yoke.

7. The locking device of claim 1, wherein the pin is configured to align with and extend through an opening of a bracket of the control pedestal.

8. The locking device of claim 1, wherein the bore is configured to allow rotation of the pin therein to align the opening of the pin with the first hole of the body.

9. The locking device of claim 1, wherein the pin comprises a locking end extending in a direction transverse to a direction of removal of the pin from the body.

10. The locking device of claim 1, further comprising a plurality of tabs configured to align with one or more detents of the control pedestal.

11. The locking device of claim 1, wherein the body is curved complementary to the control pedestal.

12. An aircraft comprising:
   a fuselage;
   a flight deck located at a front of the fuselage;
   a control pedestal having one or more control levers, the control pedestal within the flight deck;
   a locking device coupled to at least one of the one or more control levers, the locking device comprising a body dimensioned to prevent the control lever from moving when coupled thereto, a first hole defined through the body, the first hole configured to receive a lock, and a second hole defined through the body, the second hole configured to receive a tag; and
   a pin configured to be inserted within the first hole to couple the body of the locking device to the control pedestal, wherein the pin comprises an opening therethrough, the opening of the pin configured to axially align with the first hole defined through the body to receive therethrough the lock, and when inserted therethrough, the lock preventing removal of the pin from the body.

13. The aircraft of claim 12, wherein the control lever is a flap control lever configured to control operation of one or more flaps.

14. The aircraft of claim 12, wherein the control pedestal comprises a plurality of detents and the body of the locking device comprises at least one tab configured to align within one or more of the plurality of detents.

15. The aircraft of claim 12, wherein the body of the locking device comprises a yoke configured to couple around at least a portion of the control lever, wherein one or both of the first hole or the second hole extends through the yoke.

* * * * *